United States Patent [19]

Sasaki et al.

[11] Patent Number: 5,173,778
[45] Date of Patent: Dec. 22, 1992

[54] TELEVISION RECEIVER HAVING SIMPLIFIED FUNCTIONAL SELECTION AND FUNCTIONAL ADJUSTMENT CONTROL

[75] Inventors: Kazuyoshi Sasaki, Takatsuki; Satomi Nakagawa, Osaka, both of Japan

[73] Assignee: Matsushita Electric Industrial Co., Ltd., Kadoma, Japan

[21] Appl. No.: 717,821

[22] Filed: Jun. 24, 1991

[30] Foreign Application Priority Data

Jun. 29, 1990 [JP] Japan .................................. 2-173424

[51] Int. Cl.[5] ............................................ H04N 5/445
[52] U.S. Cl. .................................. 358/188; 358/194.1
[58] Field of Search ..................... 358/188, 194.1, 160, 358/22, 183; 340/706, 709, 712; 359/156, 161

[56] References Cited

U.S. PATENT DOCUMENTS 4,626,892 12/1986 Nortrup et al. ..................... 358/22 X
4,712,105 12/1987 Kohler ........................... 358/194.1 X
4,728,949  3/1988 Platte et al. ..................... 340/825.37
4,796,019  1/1989 Averbacol ........................... 340/709
4,959,721  9/1990 Micic et al. .................. 358/194.1 X

FOREIGN PATENT DOCUMENTS 62-21379  1/1987 Japan .
63-54098  3/1988 Japan .
63-187978 8/1988 Japan .
63-276089 11/1988 Japan .
1-123280  5/1989 Japan .

Primary Examiner—James J. Groody
Assistant Examiner—Mark R. Powell
Attorney, Agent, or Firm—Cushman, Darby & Cushman

[57] ABSTRACT

In a color television receiver having a hand-held remote control apparatus, "function items" representing functions of the television receiver (i.e., brightness) and "adjustment items" for adjusting the level of a "function item" (i.e., bright to dark) are displayed on the CRT screen of the television receiver. The function items are displayed on the CRT screen by pushing a first switch of the hand-held remote control apparatus. Subsequently, the color of a displayed function item is varied when one of a plurality of second switches, each corresponding to a function item, is pushed; thus designating that function item. By continuously pushing a second switch, the color of a plurality of adjustment items corresponding to the designated function item are sequentially varied in turn at a predetermined rate. When the color of a desired adjustment item is changed, the second switch is released and the desired adjustment of the television receiver is completed.

2 Claims, 2 Drawing Sheets

FIG. 2 (PRIOR ART)

MENU

| | | | |
|---|---|---|---|
| 1 BRIGHTNESS | DARK | MEDIUM | BRIGHT |
| 2 WHITE BALANCE | BLUE | NEUTRAL | RED |
| 3 NOISE REDUCTION | ON | | OFF |
| 4 COLOR AUTOMATIC CONTROL | ON | | OFF |
| 5 LOW-PITCHED SOUND LEVEL | SMALL | MEDIUM | LARGE |
| 6 HIGH-PITCHED SOUND LEVEL | SMALL | MEDIUM | LARGE |
| 7 SURROUND LEVEL | SMALL | MEDIUM | LARGE |

TELEVISION RECEIVER HAVING SIMPLIFIED FUNCTIONAL SELECTION AND FUNCTIONAL ADJUSTMENT CONTROL

FIELD OF THE INVENTION AND RELATED ART STATEMENT

1. Field of the Invention

The present invention relates to a television receiver which displays characters representing information with respect to functions of the television receiver and adjustment of the functions on the cathode ray tube thereof.

2. Description of the Related Art

A television receiver, which displays on a CRT screen "functional items" with respect to the various functions of the television receiver and "adjustment items" for adjusting the functions of predetermined functional items in a brief description, is produced on a commercial scale. In such a television receiver, a plurality of functional items and adjustment items (hereinafter both are referred to as "menu display") can be displayed on the CRT screen by manipulating, for example a "menu display" switch of a hand-held remote control apparatus, which is separated from the television receiver. The functional items are "brightness of display", "white balance" and the like, as shown in FIG. 2. The adjustment items represent instructions for adjusting the function designated by the functional item, and for example, comprise instructions of "dark", "medium" and "bright" for varying the brightness of the CRT display in the three grades. A desired functional item and a desired adjustment item in the menu display can be selected by a "selecting operation" of the hand held remote control apparatus.

In the conventional television receiver having the menu display function, first the number corresponding to a desired menu display is designated by using a key board of the hand held remote control apparatus, consequently the designation is transferred to the television receiver by a wireless signal (infrared light signal, for example), and the menu display designated in the CRT display shown in FIG. 2 is varied in color. Then a functional adjustment circuit of the television receiver is switched to the designated functional item.

Moreover, the hand held remote control apparatus is provided with a plurality of switches (push button switches, for example) for instructing individual adjustment items in the designated functional item. For example, when the functional item of "brightness of display" is designated, there are three adjustment items of "dark", "medium" and "bright", and three switches are mounted on the hand held remote control apparatus for these three adjustment items. The switches for adjusting the adjustment items are provided for each functional item. Therefore, when an operator intends to select "bright" for the "brightness of display", first the operator manipulates a switch for designating the functional item of "brightness of display", and then he must manipulate a switch for designating "bright" by selecting it from those three switches. Namely, the operator must select two switches for adjusting one functional item from a plurality of switches. Therefore the hand-held remote control apparatus involves a compleated operation of switches. Moreover, the hand-held remote control apparatus itself is complicated in construction because of the large number of the switches, and is expensive in its fabrication cost.

OBJECT AND SUMMARY OF THE INVENTION

An object of the present invention is to provide a television receiver having a remote control system in which designation of a "functional item" and an "adjustment item" of the functional item are performed by manipulating one switch.

The television receiver in accordance with the present invention comprises:

a video signal switching and processing circuit for generating video signal and an audio signal processing circuit for generating an audio signal by receiving a television broadcasting signal, a cathode ray tube for displaying video image of the video signal, sound reproducing means for reproducing sound of the audio signal, menu control means for displaying a menu display having at least one functional item of a television receiver and at least one adjustment item for adjusting the functional items on the cathode ray tube and on the television receiver on the basis of the adjustment item, said menu control means comprising:

first switch means for controlling display of the menu display, second switch means corresponding to the functional item, memory means for memorizing data of the functional item and adjustment item, menu display control means for controlling menu display by inputting the data of the memory means by a close of the first switch, for varying display color of functional item corresponding to a second switch means by close of the second switch means, and for varying display color of plural adjustment items of the functional item in turn at a predetermined periodic time by continuous close of the second switch means and for generating control signal with respect to the adjustment item which is varied in color when the second switch is released, a menu display signal generating circuit for generating menu display signal which is displayed on the CRT display by controlling of the menu display control means, a character display signal generating circuit for generating a character signal of the menu display on the basis of the output of the menu display signal generating circuit, a video control signal generating circuit for controlling video image of the video signal switching and processing circuit on the basis of designated functional item and adjustment item by controlling of the menu display control means, and an audio control signal generating circuit for generating a signal for controlling the audio signal of the audio signal processing circuit on the basis of the designated functional item and adjustment item by control of the menu display control means.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 2 is an example of CRT display of a television receiver.

Figure 1:
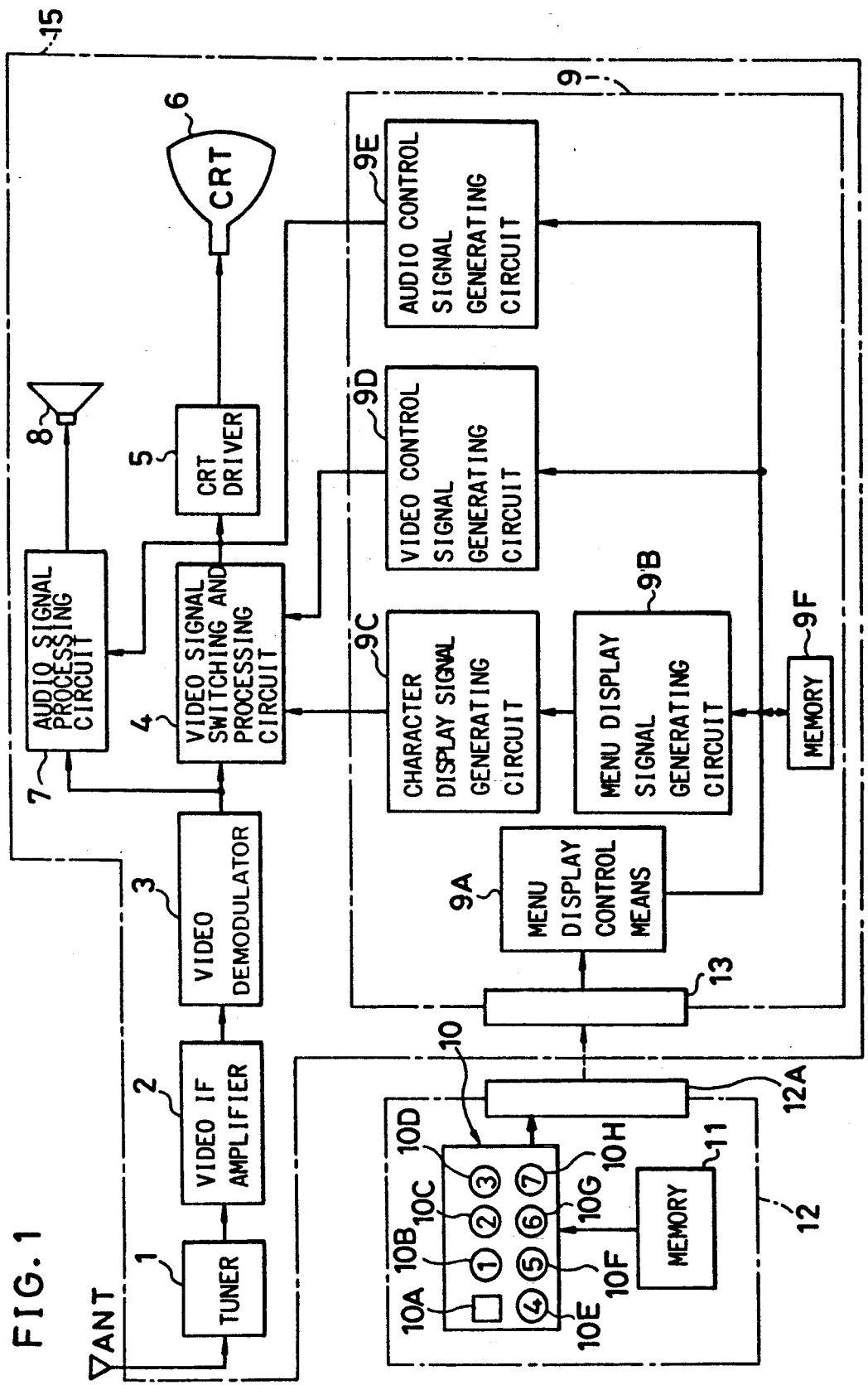
FIG. 1 is a block diagram of an embodiment of the present invention.

It will be recognized that some or all of the Figures are schematic representations for purposes of illustration and do not necessarily depict the actual relative sizes or locations of the elements shown.

DESCRIPTION OF THE PREFERRED EMBODIMENTS

FIG. 1 is a block diagram of an embodiment of a television receiver 15 in accordance with the present invention. Referring to FIG. 1, a tuner 1, a video IF amplifier 2, a video demodulator 3, an audio signal processor 7 and a CRT driver 5 are provided in a conventional television receiver. These are known in the art and their detailed descriptions are omitted.

A portable hand-held apparatus 12 for remotely controlling the television receiver is provided with a switch board 10, a memory 11 and a wireless transmitter 12A. A menu control circuit 9 for displaying a "menu display" and controlling the display has a wireless receiver 13 for receiving the wireless signal from the wireless transmitter 12A of the portable hand-held apparatus 12; a menu display control means 9A having a microcomputer and for controlling the menu display; a menu display signal generating circuit 9B and a character display signal generating circuit 9C both for generating menu display characters on the CRT 6 based on the output of the menu display control means 9A; a video control signal generating circuit 9D; an audio control signal generating circuit 9E for controlling video and sound of the television receiver 15; and a memory 9F.

The portable hand-held apparatus 12, of the wireless type, transmits a predetermined signal to the television receiver 15. In general, infrared light is used for transmitting the predetermined signal to the television receiver 15. The portable hand-held apparatus 12 is provided with the memory 11, and data of the memory 11 is transmitted by a transmitter 12A through operation of the switch board 10. The elements in the portable hand-held apparatus 12 are activated (powered) by a power source such as a battery (not shown). The switch board 10 comprises eight push button switches 10A through 10H, for example. The switch 10A activates the portable hand-held apparatus 12 and the menu control circuit 9. Therefore, the menu display shown in FIG. 2 is displayed in the CRT screen of the television receiver by pushing the switch 10A.

The switches 10B through 10H correspond to the respective functional items of the menu display shown in FIG. 2, and each switch has a number corresponding to a functional item.

The memory 11 stores coded signals representing all the functional items and adjustment items, and by manipulating one of these switches 10B through 10H, a coded signal corresponding to the switch is read from the memory 11. The coded signal is applied to the transmitter 12A and is modulated. The modulated signal is transmitted to the receiver 13 of the television receiver 15 from the transmitter 12A.

The modulated signal received by the receiver 13 of the television receiver 15 is demodulated by the menu display control means 9A. The demodulated signal is temporarily stored in the memory 9F and is applied to the menu display signal generating circuit 9B, video control signal generating circuit 9D and audio control signal generating circuit 9E. The output of the menu display signal generating circuit 9B is applied to the character display signal generating circuit 9C and a video signal representing characters is output to a video signal switching and processing circuit 4. The video signal switching and processing circuit 4 is controlled by a control signal from the video control signal generating circuit 9D, and switches between display of the menu display and display of television video signal.

Operation of menu display and adjustment of the functional items are elucidated hereafter. First, the menu display is displayed on the CRT display by manipulating the switch 10A of the portable hand-held apparatus 12. The menu display data of the memory 11 transmitted to the menu control circuit 9 by the wireless signal is stored in the memory 9F. Thus the menu display is displayed on the CRT display of the television receiver 15 as shown in FIG. 2.

Subsequently, a desired "functional item" is selected, by operating one of the switches 10B through 10H having a number and/or mark corresponding to the selected functional item. Then the display of the function selected is varied in color to indicate the functional item designated by manipulation of the switch.

For example, when adjusting "brightness of display", the switch 10B having the number "1" is operated to designate functional item number "1" on the menu display, "brightness of display" in FIG. 2. Consequently, the display of the functional item "brightness of display" is varied in color.

Moreover, when the switch 10B is continuously operated (i.e. closed) in the above-mentioned state, the displays "dark", "medium" and "bright" of the three adjustment items are sequentially varied in color in accordance with a predetermined period of time (for example, one second). These adjustment items represent brightness of the CRT display, and the display "dark" represents relatively dark display, the display "medium" represents a standard brightness or display, and the display "bright" represents relatively bright display. When an operator of the portable hand-held apparatus wishes to have a display which is relatively dark, he must release the continuously closed switch 10B Consequently, a video control signal for reducing brightness of the CRT display is generated from the video control signal generating circuit 9D and is applied to the video signal switching and processing circuit 4. Thus the brightness of the CRT display is adjusted to the relatively dark display by the video signal switching and processing circuit 4. Finally, when the switch 10A is impressed, the menu display on the CRT display is erased and a video display of the television broadcast is displayed at a relatively dark brightness setting.

In a similar manner, the CRT display and sound from a speaker 8 of the televisions receiver can be adjusted by the functional items 2-7.

As mentioned above, according to the present invention, selection of "functional items" and adjustment of the "adjustment items" in menu display of the television receiver 15 can be performed by operation of only two switches of the portable hand-held apparatus 12. Thus manipulation by the operator is simplified.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A television receiver comprising:

a video signal switching and processing circuit for generating a video signal from a received television broadcasting signal and a character signal;

an audio signal processing circuit for generating an audio signal from the received television broadcasting signal;

a cathode ray tube for displaying a video image of said video signal;

sound reproducing means for reproducing sound of said audio signal; and menu control means for displaying a menu display on said cathode ray tube, said menu display having at least one functional item of a television receiver and at least one adjustment item corresponding to each functional item for adjusting said functional item, said menu control means including, first switch means for controlling display of said menu display, second switch means corresponding to each functional item, memory means for storing data of each functional item and each adjustment item, menu display control means for controlling menu display by inputting the stored data of each functional item when said first switch means is operated, for varying a display color of a designated functional item corresponding to an operated second switch means, for sequentially varying a display color of each adjustment item corresponding to said designated functional item at a predetermined rate when said second switch means is continuously operated, and for generating a control signal corresponding to a designated adjustment item having a varied display color when said second switch is released, a menu display signal generating circuit for generating a menu display signal which represents said menu display, a character display signal generating circuit for generating said character signal from said menu display signal, a video control signal generating circuit for controlling said video signal switching and processing circuit based on said designated functional item and said designated adjustment item, and an audio control signal generating circuit for controlling said audio signal processing circuit based on said designated functional item and said designated adjustment item.

2. A television receiver in accordance with claim 1, wherein said first switch means, said second switch means and said memory means are mounted on a hand-held remote control apparatus, and the stored data of each functional item is transmitted to the television receiver from the hand-held remote control apparatus by a wireless signal.

* * * * *